Jan. 29, 1963     B. STILLER     3,075,246
DEVICE FOR MOLDING SUCTION CUPS ON ARTICLES
Filed March 22, 1960

*INVENTOR.*
BENJAMIN STILLER
BY
*William Freeman*
ATTORNEY

United States Patent Office 3,075,246
Patented Jan. 29, 1963

3,075,246
DEVICE FOR MOLDING SUCTION CUPS
ON ARTICLES
Benjamin Stiller, 1268 Garman Road, Akron, Ohio
Filed Mar. 22, 1960, Ser. No. 16,704
7 Claims. (Cl. 18—42)

This invention relates to the art of molding plastic or rubber articles and in particular has reference to improvements in devices of this kind that are employed in connection with the molding of a suction cup or an article having a suction cup molded thereon.

In the known prior art of molding presses of this general type, it has long been known that a suction cup of either rubber or plastic material can be produced in any one of several fashions. For example, the molding arrangements employed in this regard have included a mold wherein male and female components of the respective mold sections joined together in the peripheral edge region of the suction cup. In this fashion, a suction cup was created wherein a parting line existed at the periphery of the suction cup. In this regard, it has often been found necessary to effectuate a trimming operation and, in the case of a molded article having a plurality of suction cups provided on the same, such trimming operation was either impractical, impossible, or too expensive for practical use.

In other instances of molding suction cups, the parting line has been created at the base of the suction cup with the cavity that imparts design to the cup being undercut to an appropriate contour. In situations of this type, it has been necessary to pull the cup through the neck molding portion of the die and while this is readily accomplished due to the elasticity and recovery properties of rubber or plastic, it has been found that cleaning of molds of this type is for all practical purposes impossible.

Additionally, in this regard, it has been further found that it is frequently the case that all material will not be removed from the undercut area within which the cup is formed, with the result that the same will eventually become clogged and thus prevent a proper molding of the article.

It has been discovered that the aforementioned difficulties encountered can be obviated by providing an insert plate that is releasably attached to one of the mold sections, with this mold plate being appropriately apertured so as to receive and coact with certain design imparting members that are retained in place between this mold half and the insert plate that is associated therewith. In this manner, it has been found that if cleaning is necessary, it is merely necessary that the plate be removed and cleaned, after which the same can easily be repositioned in the mold half between the insert plate and the design imparting member thereof.

In addition to the above discussed advantage wherein cleaning operations are greatly simplified, it has been found that utilization of a mold device of this type greatly improves the quality of the peripheral edge surface that is provided on the molded vacuum cup, since it is believed manifest that the design imparting members, if ball bearings, for example, will be able to firmly seat with respect to the appropriately undercut aperture of the insert plate. Thus, at all times a firm contact will be provided between the ball bearing member and the aperture so as to, in effect, mold a sharp feathered peripheral edge on the cup.

Accordingly, it has been found that a perfectly formed cup can be created by having the aperture of the insert plate mold the external neck and convex portions of the cup, with the ball bearing unit being used in coaction with the insert plate to mold the usual internal concave surface of the cup.

Production of a press embodying the above advantages becomes the principal object of this invention, with other objects of the invention becoming more apparent upon a reading of the following brief specification, considered and interpreted in the light of the accompanying drawings.

Figure 1:
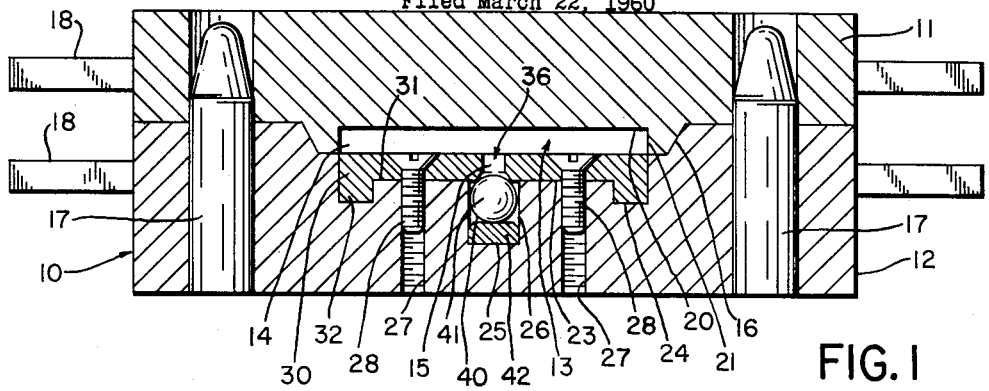
FIGURE 1 is a sectional view through a molding press embodying the features of the invention.

Referring now to the drawings and in particular to FIGURE 1 thereof, the improved molding press, generally designated by the numeral 10, is shown including upper and lower mold halves 11 and 12, with these mold halves 11 and 12 mating together to form an internal void or cavity within which an article, indicated generally by the numeral 13, can be molded with the article 13 having a base portion 14 and a projecting suction cup member, indicated generally by the numeral 15 in FIGURE 1 of the drawings.

In this regard, the construction of the mold halves 11 and 12 follows the conventional design in certain respects and the mold sections 11 and 12 are shown matched on inclined surfaces 16, with locating pins 17, 17 and handles 18, 18 being employed in conventional fashion in this regard.

Additionally, and for the purpose of forming the base portion 14, the upper mold section 11 is shown provided with an undercut area 20, with this area 20 being bounded by sidewall portions 21 to define the edge surfaces of base 14.

Considering next the construction of the design imparting portions of the lower mold section 12, it will be seen that the same is undercut to define a recessed surface 23, with this recessed surface 23 being further undercut to define a peripheral recessed surface 24 that serves to properly align the design importing plate on surface 23, as will be described. Additionally, a central undercut area 25, having sidewall portions 26, is provided for the purpose of supporting a design imparting member, as will presently be discussed. In addition to the aforementioned component parts, the mold section 12 also includes threaded apertures 27, 27 within which bolts 28, 28 can be positioned to firmly retain in place a design imparting insert plate that is indicated generally by the numeral 30, with this design imparting insert plate having a base portion 31 that is received against the surface 23 as well as a flanged peripheral portion 32 that is seated within the undercut surface 24.

Figure 2:
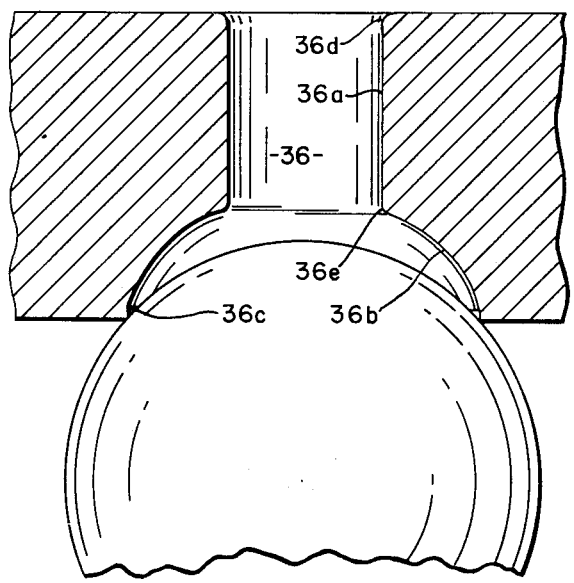
FIGURE 2 is an enlarged view showing the coaction between the design imparting members of the press.

In addition to the aforementioned structural characteristics, the insert plate 30 further includes at least one opening that overlies undercut surface 25 and is generally indicated by the numeral 36 (see FIGURE 2). In this respect, the opening 36 is utilized to mold the external neck and convex portions of the suction cup 15 and the same includes a cylindrical wall section 36a that terminates the one axial end thereof in an arcuate, contour imparting wall section 36b, that flares outwardly to define the peripheral region of cup 15.

In the preferred embodiment of the invention shown, the surface 36b terminates at its maximum diameter end in a straight cylindrical bore 36c, while rounded corners 36d and 36e are provided at the axial extremities of wall surface 36a for known relieving purposes in this regard. It is to be understood, however, that the use of such surfaces as the surface 36c, 36d and 36e is optional and may be disposed of if desired. Specifically, in this regard, it is to be noted that the thickness of the molded cup could be controlled by varying the axial length of the cylindrical surface 36c and, accordingly, if a weaker or less thick cup was desired, the length of surface 36c could either be decreased or eliminated.

In addition to the aforementioned component parts, the lower mold 12 further includes a design imparting member 40 that is illustrated in the form of the invention as being a spherical ball bearing member 41. Preferably, this ball 41 is received against a back-up plate 42 that is in turn seated on the undercut surface 25, with the external surface of the ball bearing member 41 also engaging end surface 36c, as is clearly shown in FIGURE 2 of the drawings.

By use of the above structure, it is believed apparent that an internal void will be created between the matched mold sections 11 and 12, with this void having its walls defined by undercut surface 20, wall surfaces 21, 21, opening 36 and the external surface of ball member 41 that overlies opening 36.

In use or operation of the improved molding device, it will first be assumed that the component parts have been assembled as shown in the drawings, with the insert plate 30 having been secured to lower mold section 12 by bolts 28, 28 and with mold section 11 having been aligned and moved into operating abutment with mold section 12 by use of registering pins 17 and handles 18.

Accordingly, and assuming that a slug of rubber material has been positioned on the plate 30 prior to such closing, it is believed apparent that the pressure of closing will cause this slug of material to fill the extremities of the void that is created between the mold sections 11 and 12 and the article will be molded in known fashion to outline configuration of the void, with the base portion 14 of article 13 being formed by surfaces 20 and 21, while the suction cup portion 15 thereof will be formed by the opening 36 and the ball bearing member 41.

When the article has been molded, it is merely necessary that the mold sections 11 and 12 be separated, at which time the base portion 14 of the article will become separated from mold section 12 by merely stripping the same through, with the enlarged head region of the suction cup 15 passing through the reduced diameter 36a during such stripping action.

In the event it becomes necessary to clean the mold, it is merely necessary that the bolts 28, 28 be removed, at which time the insert plate can be removed and easily cleaned. Upon resetting of the same, it is believed apparent that continuation of the above described molding technique can be resumed.

With regard to the diameter of the ball member 41, it is to be understood that the same can be varied to change the degree of concavity of the cup surface that is molded by the same and, accordingly, the wall sections 26, 26 are shown out of contact with the ball member 41 so as to permit the use of a smaller or larger diameter ball, as the case may require. In this regard, it is believed manifest that the back-up plate 42 could be either increased or decreased in thickness upon changing of the ball diameter so that in all cases, the same would urge the ball member into contact with the opening 36.

Additionally, it is to be understood that the preferred embodiment contemplates that the ball member 41 may be of a different hardness than the insert member 30 so that a coining of the ball 41 into the opening 36 will occur. Also in this regard, the back-up plate 42 could be of a different material than the ball 41 so as to either be harder or softer than the same, as the case may require. It is, of course, manifest that the back-up plate could be eliminated in cases of high production runs on the same type of suction cup wherein it was not desired to vary the degree of concavity of the molded suction cup.

It will be seen from the foregoing that there has been provided a new and improved type of molding press wherein the cleaning of the undercut cavity portions that are normally used to form a suction cup is obviated by the use of contoured design-forming members that are releasably associated with a detachable design imparting insert plate. In this fashion, all members that serve to contour or form the suction cup can be easily removed for the purpose of cleaning the same.

It has been shown how the use of relatively inexpensive ball bearing members insures a perfect peripheral edge being formed in all cases, while having the further advantage of eliminating the machining of relatively expensive male dies that would otherwise have to be used for this purpose.

While the press of the present invention has been illustrated as being a conventional pressure type press wherein the forming is done upon application of closing pressure, it is to be understood that the inventive principle herein contemplated could be employed if supply gates of other supply means were provided to make the unit a transfer or injection type of press.

Figure 3:
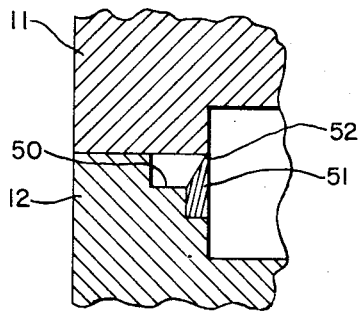
FIGURE 3 is a fragmentary sectional view of a modified form of the invention.

In the modification shown in FIGURE 3, there is contemplated the use of certain self-trimming equipment in connection with the trimming of normal rind that occurs at the parting line point of juncture. Accordingly, in this modification lower mold section 12 is further undercut, as at 50, so as to receive an insert ring 51 having a sharp edge surface 52 that will contact the upper mold section 11 and effectuate a self-trimming action during each molding operation. In this regard, the cavity created by the undercut 50 serves as a collection cavity so that upon molding of the article, the glob of material received therein can be manually removed by tearing the same from the molded article.

While a full and complete disclosure of the invention has been set forth in accordance with the dictates of the patent statutes, it is to be understood that the invention is no intended to be limited to the various forms illustrated herein.

It is to be particularly understood in this regard that the invention has particular utility in connection with a rubber sheet having suction cups projecting from both opposed faces thereof, with trimming of this type of apparatus not being capable of being achieved by the known devices presently on the market.

Accordingly, modifications of the invention may be resorted to without departing from the spirit hereof or the scope of the appended claims.

What is claimed is:

1. A molding device of the character described, comprising; first and second mold sections; said first mold section having a flat mating face; first and second support surfaces defined by said first mold section; said first support surface being offset with respect to the plane of said mating face; said second support surface being offset with respect to the plane of said first support surface; an insert plate supported on said first support surface and having an opening therethrough that is aligned with said second support surface in spaced relationship therewith and further having a bottom surface that is spherically undercut adjacent said opening; a design imparting member supported with respect to said second support surface and having a spherical portion closing the open end of said opening that is in alignement with said second support surface during the period that said insert plate is supported on said first support surface; said opening, said spherically undercut portion and said design imparting member defining a mold cavity of generally circular and concave configuration during the period of engagement therebetween.

2. The device of claim 1 further characterized by the fact that said design imparting member is ball shaped; said opening being of generally elongate configuration and having cylindrical walls which flare outwardly at one end thereof in arcuate configuration to define a concave surface that coacts with said ball member to define a mold cavity.

3. The device of claim 2 further characterized by the fact that said diameter of said ball relative to the diameter of said opening is such that said ball contacts said bottom of said insert plate upon access of said ball into said opening without contacting the cylindrical walls of said opening.

4. The device of claim 2 further characterized by the presence of a back-up plate positioned between said design imparting member and said second support surface.

5. The device of claim 4 further characterized by the fact that said design imparting member is of a different hardness than said backup plate.

6. The device of claim 2 further characterized by the presence of a third support surface that is offset with respect to said first support surface of said first mold section; and an insert ring supported on said third support surface and adapted to encircle the peripheral edge of said insert plate.

7. A molding device of the character described, comprising; first and second mold sections; said first mold section having a flat mating face; first and second support surfaces defined by said first mold section; said first support surface being offset with respect to the plane of said first support surface; an insert plate supported on said first support surface and having an opening therethrough that is aligned with said second support surface in spaced relationship therewith and further having a bottom surface that is spherically undercut adjacent said opening; a design imparting member supported with respect to said second support surface and having a spherical portion closing the open end of said opening that is in alignment with said second support surface during the period that said insert plate is supported on said first support surface; said opening, siad spherically undercut portion and said design imparting member defining a mold cavity of generally circular and concave configuration during the period of engagement therebetween; and a second mold section having a flat mating face that complementally engages said flat mating face of said first mold section; said flat mating face of said second mold section being undercut in opposed relationship to said first support surface of said first mold section, whereby said first and second mold sections define an internal cavity that connects with said mold cavity during the period that said mating faces thereof are in complemental engagement with each other.

References Cited in the file of this patent

UNITED STATES PATENTS

| | | |
|---|---|---|
| 1,992,170 | Burchett | Feb. 26, 1935 |
| 2,459,205 | Wells et al. | Jan. 18, 1949 |
| 2,607,080 | Stewart | Aug. 19, 1952 |
| 2,981,976 | Maier | May 2, 1961 |

FOREIGN PATENTS

| | | |
|---|---|---|
| 705,314 | Great Britain | Mar. 10, 1954 |
| 56,865 | Netherlands | Aug. 15, 1944 |